Sept. 8, 1953 C. A. MILLS 2,651,503
SYSTEM OF RADIANT HEAT EXCHANGING
Filed Dec. 2, 1950
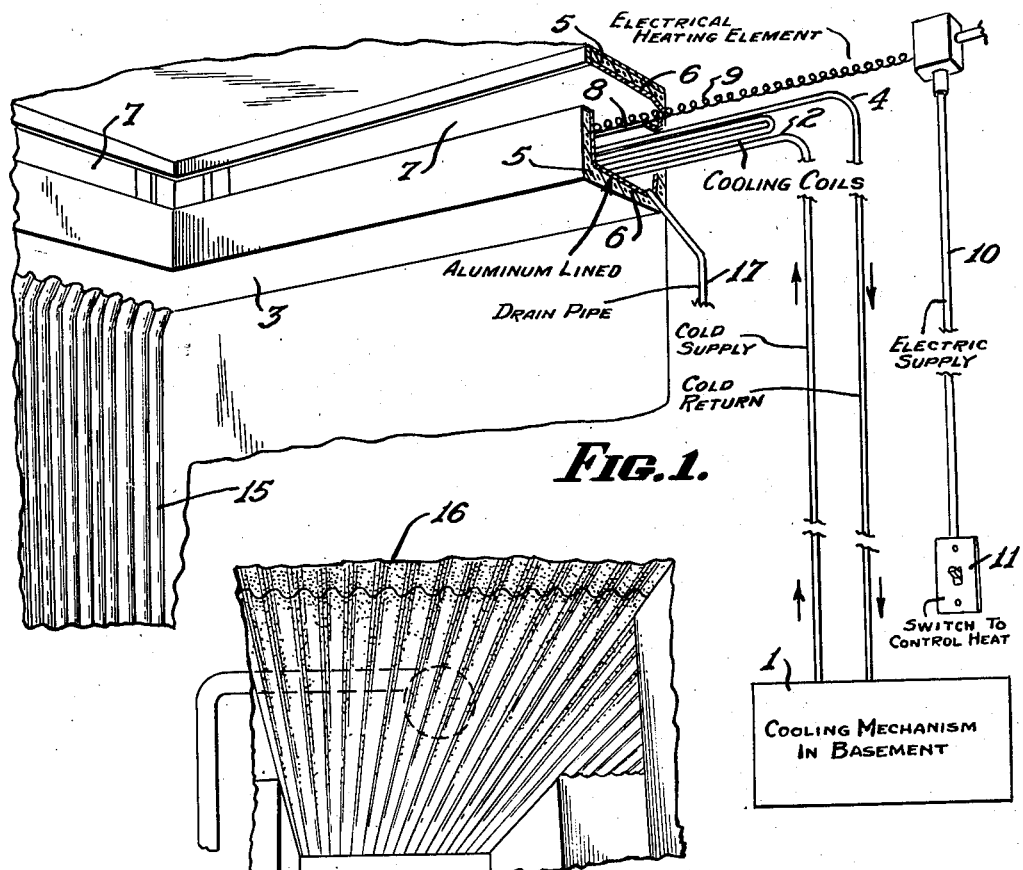
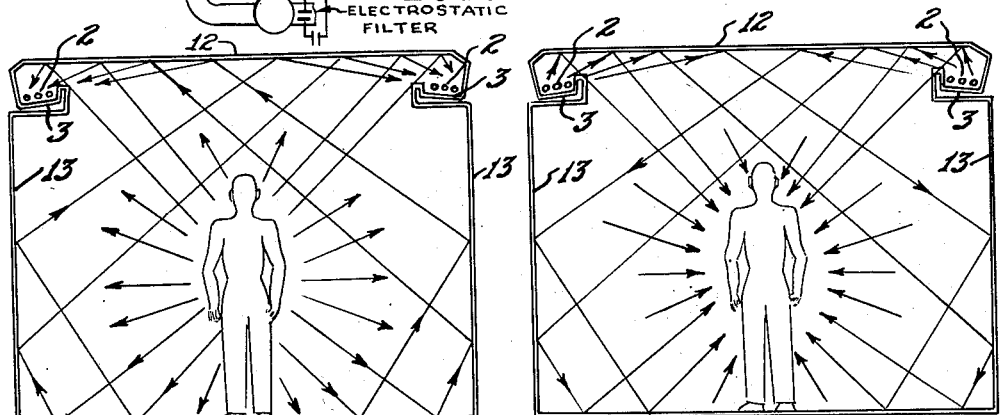
Inventor.
CLARENCE A. MILLS,
By
Attorneys.

UNITED STATES PATENT OFFICE 2,651,503

SYSTEM OF RADIANT HEAT EXCHANGING

Clarence A. Mills, Cincinnati, Ohio, assignor to Reflectotherm, Inc., Cincinnati, Ohio, a corporation of Ohio Application December 2, 1950, Serial No. 198,805

4 Claims. (Cl. 257—8)

This invention relates to radiant heat exchanging apparatus and a system of controlling the exchange of radiant heat loss particularly from living organisms such as human beings, animals, birds, reptiles, insects and the like which, through the life process, generate heat. The system may also be utilized for maintaining fixed temperatures of articles, for example such as food stuffs which deteriorate with extreme changes of temperature, but which will keep fresh for long periods if maintained at constant temperatures.

To have body and clothing warmed by radiant heat is readily grasped by most people, as they have experienced it repeatedly in front of fireplaces or in winter sunshine. Radiant cooling proves puzzling, however, even though it is merely radiant heating in reverse.

My radiant heat exchange system is based upon sound principles of physics and physiology. The human body and other living organisms have no need to be heated. The life process itself generates heat from its own internal fires so long as life lasts.

My primary concern is proper control of the rate at which this inner heat is lost by human beings from the skin surfaces and air passages. If external losses are too rapid, one feels chilly; if too slow, one's own internal heat piles up inside and makes him hot. My system provides the simplest and most economical method of balancing heat loss against inner production.

Ordinarily one loses heat by radiation, conduction-convection, and water evaporation. The last of these three is largely an emergency measure brought into play when one is uncomfortably warm; man usually seeks to avoid sweating by reducing hot-weather mental and physical activity whenever possible. The conduction-convection avenue of heat loss is the one around which air conditioning has been built; here air temperatures are of paramount importance. Radiant heat loss from the body—the third avenue—is possible only when surrounding materials have surface temperature below those of the skin. Surface radiation from most materials is proportional to surface temperatures, hence bodies exposed to one another are continually exchanging radiant heat even when they finally come into balance. This exchange goes on quite independently of air temperatures or humidity. The net flow, however, is always from warmer to cooler surfaces.

Use of heat-reflective walls and ceilings in all kinds of walled enclosures within which people live, for both radiant heating and radiant cooling is entirely novel. The key to the success of reflective radiant conditioning for controlling body heat loss within a walled enclosure lies in the provision of radiant heat reflective wall coverings. The use of metal foil for example, as a wall covering in a room or house, is not only non-esthetic, but it presents many optical disadvantages and hazards to the eyes of the occupants living in such room or house. As wall covering I preferably provide foil, the face of which is coated with pigment-bearing lacquer. Full reflectivity is maintained for heat rays beyond the range of the visible spectrum. Even for wavelengths in the visible range there is considerable transparency, giving the coated foil life and sheen.

Radiant heating or radiant cooling from hot or cold wall surfaces is not new—in fact engineers always enter such factors into their air conditioning calculations. In my system, however, wall and ceiling surfaces act only as passive reflectors of heat rays travelling between the bodies of the persons within the rooms and concealed heating or cooling elements. With hot or cold walls, there is quite rapid heating or cooling of contiguous air and the formation of vertical air currents which lead to warming or cooling of the whole mass of room air. This is minimized by having wall surface temperatures the same as those of adjacent air.

Heating and cooling elements through the house are located in the troughs encircling each room near the ceiling. Batteries of cooling coils lie in the troughs. The troughs are lined with aluminum or other radiant reflective surfacing material with no part extending above such level of the trough's front facing as to reflect down into the room. Thus, the only air to be cooled or dehumidified in summer heat is that lying in the hollow of the trough itself. Since cooled air is heavier, there is no overflow of the cold air over the front facing out into the room.

Location of the heating elements up near the ceiling likewise gives little air heating, since any air heated by conduction is light and layers up against the ceiling. I thus have minimized the heating or cooling of room air, while leaving the heating and cooling elements exposed to the room occupants by reflection from ceilings, sidewalls and trough-lining. Only on the lower exposure in each room are there materials which absorb or give off radiant heat (rugs, furniture, etc.).

All these precautions to minimize heating of the room air in winter cold or its cooling in summer heat constitute the real core of my invention, for through these means I achieve the desired transfer of heat to or from a room occupant largely through reflective radiant channels.

In winer operation, my reflective radiant conditioning system produces primary warming (by radiant-heat input) of room occupants, rugs and furniture fabrics. Warmed rugs and furniture fabrics then in turn re-radiate this heat back upward into the room to help produce the final radiational intensity needed for bodily comfort at whatever air temperature is at the time prevailing. At above normal air temperatures in our heat-reflective-surfaced rooms, operation of the cooling system is needed to bring about active reduction in the room's intensity of heat radiations. As room temperatures rise progressively above normal, increasing amounts of radiant heat are removed onto the trough's cold surfaces and the outward flow of radiant heat from the room's occupants thus properly facilitated.

In actual year-round operation, reflective radiant conditioning has demonstrated that rug and furniture fabrics are several degrees warmer than contiguous air in winter heating and several degrees cooler in summer cooling. As a result room air is warmed in contact with these radiantly warmed surfaces in winter and cooled when summer cooling is in operation. Such secondary air warming in winter and cooling in summer aids in achieving occupant bodily comfort, although heat radiational intensity within the room's confines remains the major factor in this respect. In any case, radiant heat input and radiant heat removal remain the primary purpose of reflective radiant conditioning, whether this radiant heat input or removal acts on the room occupant directly or secondarily by virtue of its primary effect on rug and furniture fabric materials.

For high operating efficiency in winter heating and summer cooling, all these mentioned precautions to minimize direct heating or cooling of room air are necessary and constitute an important part of my invention. In this respect my use of wall and ceiling surfacing of high radiant-heat-reflectivity are also of basic operating importance, for they transform these room surfaces from major sources of winter heat loss or summer heat gain into mere passive mirror-like reflectors of radiant heat rays on their way to or from the heating-cooling trough elements and room occupants and furnishings.

In order to achieve efficient reflective radiant conditioning, such heat-reflective wall and ceiling surfaces must be directly exposed to the room interior and cannot be covered with any material unless that material be freely transparent to long-wave heat waves such as those radiated from occupant's body. Heat reflective surfaces in the wall or ceiling are without value in my reflective radiant conditioning, for their heat-reflective function comes into play only after radiant heat within the room has been absorbed by wall surfaces and been transmitted on through the wall by kinetic heat conductance to be re-radiated on toward the buried heat-reflective surface. Thus the wall surfaces facing the room's interior will have lost their necessary heat-reflective function and will have become merely room surfaces in contact with which air warming is facilitated in winter heating and air cooling in summer cooling operations. A severe handicap of having such cooled room surfaces exposed to room air in summer cooling is that undesirable moisture condensation tends to take place on all such cooled surfaces and to create a serious drip problem. This problem is my reflective radiant conditioning system I localize to the trough.

While I have shown and described electric resistance heating and Freon coil cooling in my description, it should be understood that an alternative system incorporates only a single flattened pipe or coil lying in the opening of the trough. The circulation of pre-heated or pre-cooled water or other liquid through such pipe or coil is under such automatic control devices as cause the proper amount of radiant heat emanation into the room on its removal therefrom.

Window coverage is of three kinds, (1) aluminum slat Venetian blinds, (2) draperies woven with a nylon warp and an inner facing of heat reflective foil yarn, and (3) nylon fabric with aluminum deposited on both inner and outer faces.

Large areas of vertical heat-absorbing materials which create convection air currents and change the radiant heating or cooling over to air heating or cooling are to be avoided. The system fails insofar as such air temperature changes occur.

Window draperies are adequate to cover all glassed openings in periods of severe heat or cold and give completely reflective surface on all sides of the room. With this simple provision for temperature extremes, I employ large picture windows or complete glass walls without using expensive thermopane.

Several interesting features are incorporated into the ventilating system of a house in which my system is installed. In the first place, lack of concern over indoor air temperatures in either winter cold or summer heat allows me to bring in as much outside air as is desired at all times. This air is cleansed in the electrostatic filter, but it is not changed in any other way. No effort is made to alter its temperature or humidity.

The electrostatic filter and its variable-speed fan can pump into a house up to 1000 cubic feet of cleansed air per minute. With this volume of air delivered downward through the entire central hall ceiling, I establish enough of an indoor positive pressure to secure an outward draft through the cracks or openings in all rooms. Increased flow of this clean, fresh air into living room during heavy occupancy, or into bedrooms at night, can be secured by setting the proper windows slightly ajar.

With the cleansed outside air being delivered radially outward from the central hall into all rooms, there is little tendency to a bulid-up of warmed air in occupied rooms.

Having thus discussed generally the system for controlling body heat loss by my radiant heat exchanger system within a walled enclosure such as a house, I will indicate diagrammatically the several features of the system.

In the drawings:

Figure 1 is a perspective view of the preferred arrangement of the trough housing, the heating and cooling unit.

Figures 2A and 2B are diagrams illustrating how controlling the body heat loss of an occupant of a radiant-conditioned room takes place.

Figure 3 is a perspective view of a perforated panel forming one type of incoming filtered air distribution.

Referring first to Figure 1, there is shown at 1, preferably in a basement underneath the walled enclosures of the house, a refrigeration compressor through which a condensed refrigerant gas is permitted to expand in the cooling coils 2 mounted a in ceiling corner trough generally indicated at 3. The return from the expansion cooling coils 2 is through the compressor intake line 4. While I have only indicated one cooling coil it will be obvious that branch pipes may extend to other rooms in the house in which separate coils are mounted.

The trough illustrated has insulative bottom side and top walls 5, lined with aluminum sheets 6. It will be observed that the only opening in the trough is a side opening 7. It is through this that all the radiant heat waves pass and from the construction of the front side wall it will be observed that the cooling coil is below the level of the top of the side wall so that rays will only pass outwardly and upwardly against the ceiling, the side wall thus forming a barrier against direct radiation downwardly against people within the room.

On an insulated bracket 8, I have shown the coils 9 of an electrical heating element controlled by electric supply lines 10 from a switch 11 which may, if desired, be thermostatically controlled.

In Figures 2A and 2B I have illustrated the reflective principle by which the body heat loss is controlled. In Figure 2A the cooling coils 2 are indicated within the conduit 3. In this diagram the arrows indicate the scope of radiation away from the body which keeps the occupant of the room cool in hot weather. The ceiling is papered with pigment coated foil 12. The side walls are papered with pigment coated foil 13 and the floor is lined with aluminum sheets 14 and also has rugs which may be provided with an interweave of strands of fine aluminum wire so as to make it reflective.

I may also have draperies and curtains such as are indicated by the curtain 15 indicated in Figure 1.

In the hallway of the house or otherwise arranged in a passage not ordinarily occupied by the persons living in the house, I have illustrated in Figure 3 a perforated aluminum ceiling 16 through which electrically filtered air (which is not otherwise treated to change its temperature) is introduced into the walled enclosures of the house at a rate which may be as high as 1000 cu. ft. per minute. Such an introduction of air causes the walled enclosure to be pressurized so that all drafts from outside in are avoided and the air currents are always from the inside of the walled enclosure to the outside so that dust and dirt and germs of all kinds carried by air currents are kept out. Of course, in principle my system will function in many applications without the necessity of pressurizing the enclosure. In a house the pressurizing system almost completely minimizes ordinary household dirt and dust, there being no way for dust or dirt to get into the house. Further, the avoidance of dust formation maintains the reflective surfaces bright and clean, so that continued reflectivity at maximum efficiency is achieved.

The system in my walled enclosure works the same way as indirect lighting except that, instead of diffusing visible light rays, invisible heat rays are handled. In winter, heating coils radiate heat rays which are reflected around the foil-lined walls of the room so that they hit a person or an object to be radiant conditioned within the room from every angle, just like light rays in a brightly lit room. In summer, the process is reversed. Then one's body may be compared to the heating element giving off the heat rays. These rays are bounced around the room surfaces until they ultimately hit the cooling coils in the troughs. Circulating a cold liquid in these coils absorbs this heat and carries it away. Condensation on the pipes is disposed of by a drain from a low point in the trough such as indicated at 17 on the view shown in Figure 1.

As I have stated, the cooling coil shown, instead of containing a circulating refrigerant liquid or gas, may contain cooled water and the same coil may also be used for heating, in which event a heated gas or liquid will be passed through it when reflective radiant heat is required to minimize the heat loss from the body. While in a house in the northern part of the United States, ordinarily both radiant heating and cooling are desirable, there are many parts of the country in which cooling only will be required. Also some climates require continuous heating only. My system contemplates either or both.

Thus, in my house, comfort is maintained exclusively by radiant means, without the necessity of ever heating or cooling the air. One feels "cooled" or "warmed" because the rate of heat loss is exactly right for the weather—neither too much nor too little.

Since heat rays travel with the speed of light, a radiant system such as I have disclosed, gives comfort conditions rather quickly. Once there is an occupant of the room and the system is working, it may be modulated like any other. There are preferably provided a series of thermostatic controls which automatically adjust the heating or cooling to the needs of those in the room.

There is no tendency for the walls to sweat, like an ice-tea glass because the walls themselves never get cold. They stay pretty near room-air temperature while directing heat rays to the cooling coils. This is because the surface temperature of a reflective material is not affected by the heat rays that it reflects.

It will be obvious that all sorts of variations may be made in wall contours and the plans for houses, rooms, railway cars, automobiles, aeroplanes and the like, in which my system is incorporated without departing from the engineering and scientific principles involved and as set forth in the claims which follow.

Having thus described my invention, what I claim as new and desire to secure by Letters Patent is:

1. A body heat loss controlling system comprising an enclosure having a ceiling, walls, and floor, said ceiling, walls and floor having substantially fully reflective interior surfaces for heat rays beyond the range of the visible spectrum, means for delivering into said enclosure filtered air under a pressure greater than that of the ambient atmosphere whereby soiling of the heat reflective surfaces which would make them less than substantially fully reflective is prevented, a trough opening into said enclosure supported adjacent to said ceiling, one wall of said trough facing into said enclosure and extending upwardly from the bottom of the trough towards said ceiling, and heating and cooling means, selectively operable, positioned within said trough, the said one wall of said trough extending upwardly to a point above the uppermost part of said heating and cooling means, so as to prevent heavy cold air from overflowing into said enclosure.

2. A body heat loss controlling system comprising an enclosure having a ceiling, walls, and floor, said ceiling, walls and floor having substantially fully reflective interior surfaces for heat rays beyond the range of the visible spectrum, means for delivering into said enclosure filtered air under a pressure greater than that of the ambient atmosphere whereby soiling of the heat reflective surfaces which would make them less than substantially fully reflective is prevented, a trough opening into said enclosure supported adjacent to said ceiling, one wall of said trough facing into said enclosure and extending upwardly from the bottom of the trough towards said ceiling, a conduit communicating with the bottom of said trough to drain the trough of condensate, and heating and cooling means, selectively operable, positioned within said trough, the said one wall of said trough extending upwardly to a point above the uppermost part of said heating and cooling means, so as to prevent heavy cold air from over-flowing into said enclosure.

3. A body heat loss controlling system comprising an enclosure having a ceiling, walls, and floor, said ceiling, walls and floor having substantially fully reflective interior surfaces, consisting of heat-transparent pigment coated aluminum foil, means for delivering into said enclosure filtered air under a pressure greater than that of the ambient atmosphere whereby soiling of the heat reflective surfaces which would make them less than substantially fully reflective is prevented, a trough opening into said enclosure supported adjacent to said ceiling, one wall of said trough facing into said enclosure and extending upwardly from the bottom of the trough towards said ceiling, and heating and cooling means, selectively operable, positioned within said trough, the said one wall of said trough extending upwardly to a point above the uppermost part of said heating and cooling means, so as to prevent heavy cold air from over-flowing into said enclosure.

4. A body heat loss controlling system comprising an enclosure having a ceiling, walls, and floor, said ceiling, walls and floor having substantially fully reflective interior surfaces for heat rays beyond the range of the visible spectrum, means for electrostatically filtering air and for delivering the filtered air into said enclosure at a pressure greater than that of the ambient atmosphere, whereby soiling of the heat reflective surfaces which would make them less than substantially fully reflective is prevented, a trough opening into said enclosure supported adjacent to said ceiling, one wall of said trough facing into said enclosure and extending upwardly from the bottom of the trough towards said ceiling, and heating and cooling means selectively operable, positioned within said trough, the said one wall of said trough extending upwardly to a point above the uppermost part of said heating and cooling means, so as to prevent heavy cold air from over-flowing into said enclosure.

CLARENCE A. MILLS.

References Cited in the file of this patent

UNITED STATES PATENTS

| Number | Name | Date |
|---|---|---|
| 2,172,771 | Norris | Sept. 12, 1939 |
| 2,519,109 | Callender | Aug. 15, 1950 |

FOREIGN PATENTS

| Number | Country | Date |
|---|---|---|
| 61,876 | Norway | Jan. 8, 1940 |
| 366,770 | Great Britain | Feb. 11, 1932 |

OTHER REFERENCES

Publication: Heating, Piping and Air Conditioning Magazine, November 1937, pages 697–699.